United States Patent [19]
Olger

[11] Patent Number: 4,641,412
[45] Date of Patent: Feb. 10, 1987

[54] PIN DRIVING TOOL

[76] Inventor: Glenn E. Olger, 14460 Robson Rd., Bath, Mich. 48808

[21] Appl. No.: 777,688

[22] Filed: Sep. 19, 1985

[51] Int. Cl.⁴ .................. B23P 19/00; B23P 11/00

[52] U.S. Cl. .................. 29/426.5; 29/428; 29/526 R; 29/270; 173/128

[58] Field of Search .................. 29/426.5, 426.1, 428, 29/525, 526 R, 270, 275, 276, 254, 255, 81, 463; 173/129, 91, 128

[56] References Cited

U.S. PATENT DOCUMENTS

| | | | |
|---|---|---|---|
| 878,041 | 2/1908 | Butsch | 29/276 |
| 1,039,947 | 1/1912 | Hunn | 29/276 |
| 1,355,631 | 10/1920 | Wellbrook | 29/276 |
| 2,068,045 | 1/1937 | Wohlmeyer | 173/129 |
| 2,495,775 | 1/1950 | Rouentini | 29/276 |
| 4,494,612 | 1/1985 | Bell | 173/129 |

FOREIGN PATENT DOCUMENTS

| | | | |
|---|---|---|---|
| 23701 | 12/1949 | Finland . | |
| 975499 | 3/1951 | France | 173/91 |
| 1334385 | 10/1973 | United Kingdom | 29/275 |

*Primary Examiner*—Mark Rosenbaum
*Assistant Examiner*—Irene Graves-Golabi
*Attorney, Agent, or Firm*—Ian C. McLeod

[57] ABSTRACT

A pin driving tool is described for removing or inserting pins (103) which hold the backhoe teeth (101) in place on a bucket (100). The tool includes a driving bar (10*c*) with a handle (13) and with a pair of spaced apart side rails (10*a*, 10*b*) defining an opening (10*c*) for a plurality of the teeth (101). A drive punch (14 or 16) is removably connected to the driving bar (10) by a fastener (17) so that a pin can be removed or inserted from the teeth (101) on the bucket (100) by the tool.

8 Claims, 4 Drawing Figures

PIN DRIVING TOOL

Figure 1:
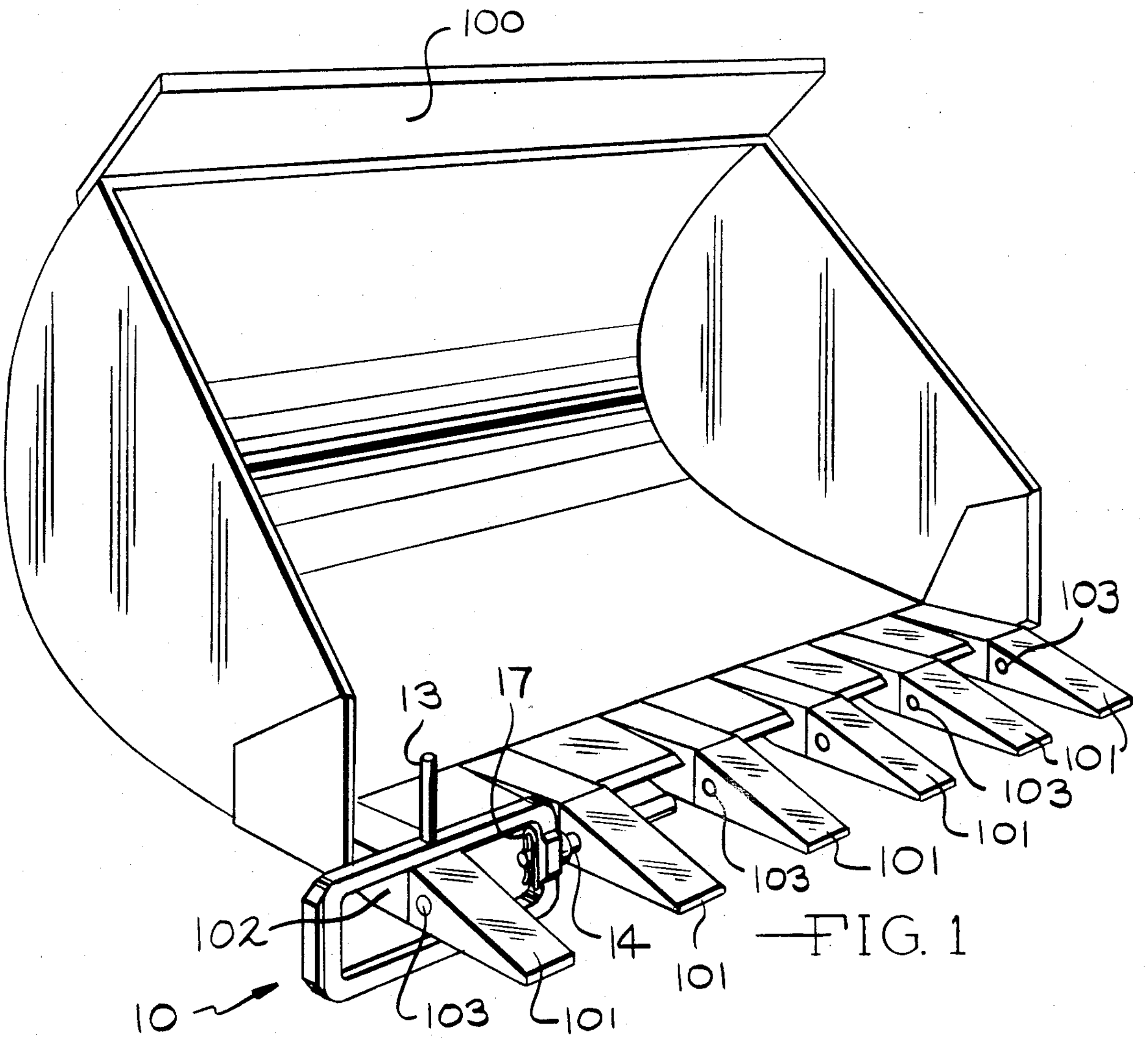

BACKGROUND OF THE INVENTION (1) Field of the Invention

The present invention relates to a pin driving tool for removing or inserting pins, particularly pins which hold the backhoe teeth in place on a digging means or bucket. In particular the present invention relates to a pin driving tool for removing or inserting the pin which includes a driving bar and a drive punch means removably mounted on the driving bar by a fastener. Preferably the fastener is a cotter pin which allows the use of multiple, removable punches.

(2) Prior Art

Punches or other pin driving tools are known for removing and inserting pins. These tools function very well in settings where the pin to be driven is accessible. The problem is that these tools have a solid body along the driving axis. It is virtually impossible to service backhoe teeth which are connected to a bucket or the like by pins with the prior art pin driving tools where the teeth are closely spaced together and the pins are mounted between the teeth. The inventor is not aware of any other prior art showing a pin driving tool having an opening along the driving axis and adapted for removing pins from between a plurality of teeth on a backhoe bucket.

OBJECTS

It is therefore an object of the present invention to provide a pin driving tool with a driving bar having a pair of spaced apart side rails providing an opening for a plurality of backhoe or bucket teeth so that pins can be removed from between the teeth. It is further an object of the present invention to provide a removable drive punch mounted on the drive bar with a fastening means which holds the punch on the bar. These and other objects will become increasingly apparent by reference to the following description and the drawings.

IN THE DRAWINGS

FIG. 1 is a perspective view of the preferred pin driving tool of the present invention, particularly illustrating a driving bar 10 having an opening 10*c* with a drive punch 14 for removing pins mounted on the bar and also illustrating the inter-tooth positioning of the pins 103 which hold the backhoe teeth 101 in place on a bucket 100.

Figure 2:
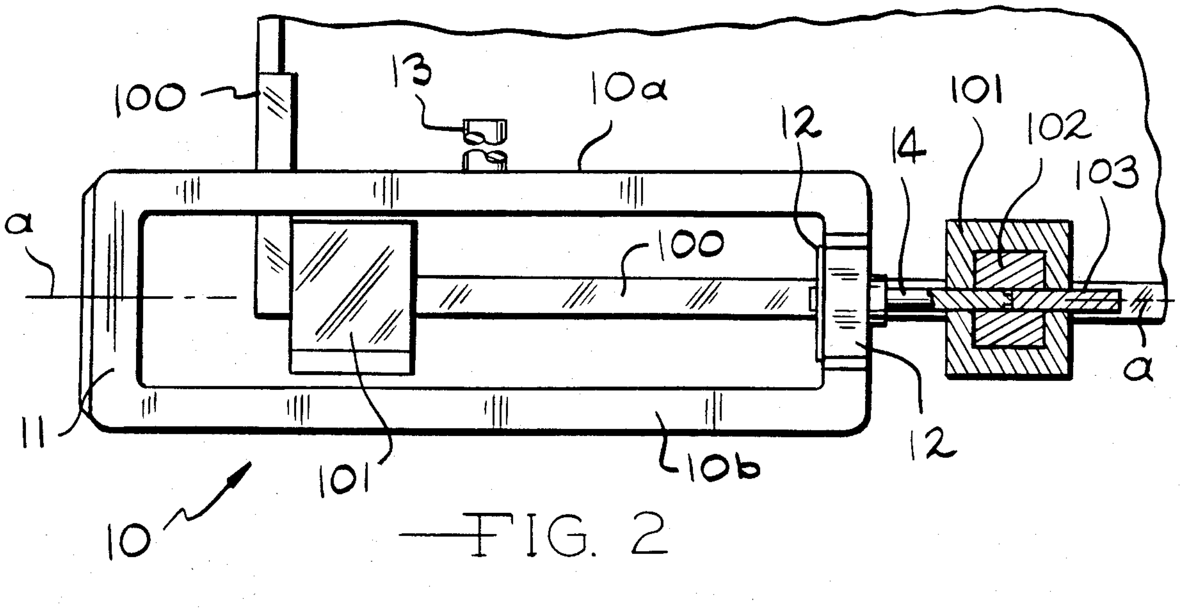

FIG. 2 is a front view of the pin driving tool of the present invention, particularly illustrating the driving bar 10 having a longitudinal driving axis a—a and having the drive punch 14 mounted on the driving bar 10 by a fastener or cotter key 17 and which removes pins 103 from the teeth 101 and tooth holders 102.

Figures 3, 4:
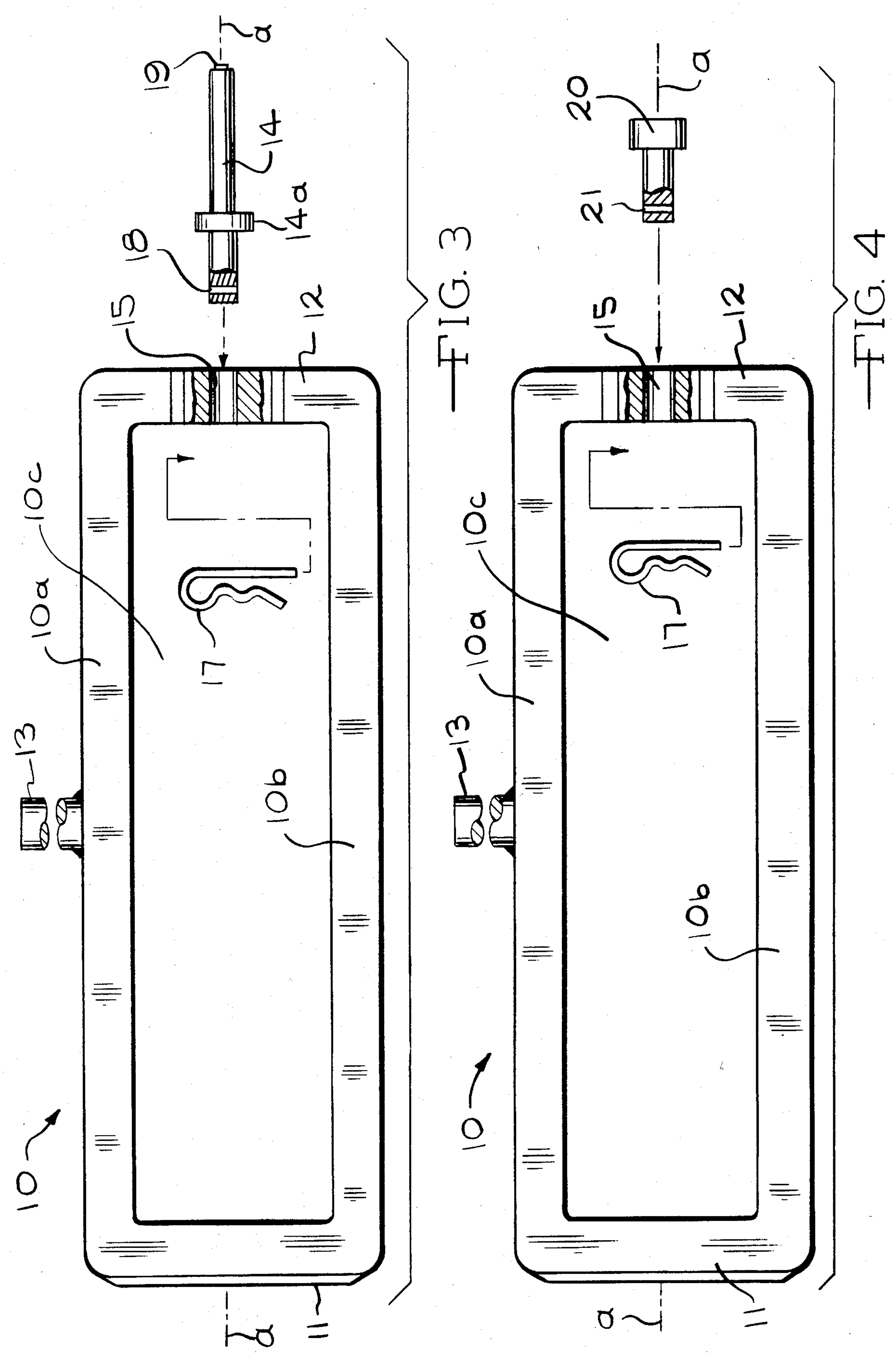

FIG. 3 is a front view of the pin driving tool with the drive punch 14 disconnected from the tool, wherein the punch has an elongate round head 19 for removing the pins 103.

FIG. 4 is a front view of the pin driving tool as shown in FIG. 3 particularly illustrating another drive punch 16 having a flat head 20 for inserting the pins 103.

GENERAL DESCRIPTION

The present invention relates to a pin driving tool which comprises: a driving bar having a longitudinal driving axis with spaced apart side rails on opposite sides of the axis and opposed first and second ends between the rails defining an opening for a plurality of teeth on a digging means wherein the first end is for driving the bar; a drive punch means mounted on the second end of the bar along the axis and which is shaped for removing or inserting a pin holding the teeth on the digging means.

The present invention further relates to a method for removing or inserting pins which comprises: providing a pin driving tool for inserting or removing a pin which holds a tooth in place on a digging means wherein the tool comprises: a driving bar having a longitudinal driving axis with spaced apart side rails on opposite sides of the axis and opposed first and second ends between the rails defining an opening for a plurality of teeth on a digging means, wherein the first end is for driving the bar, and a drive punch means mounted on the second end of the bar along the axis and shaped for removing or inserting the pin holding the teeth on the digging means; placing the driving bar between the plurality of teeth with the drive punch means against the pin; and driving the bar at the first end to remove or insert the pin.

SPECIFIC DESCRIPTION

Referring to FIGS. 1 to 4, a pin driving tool adapted for removing or inserting pins 103 which hold the backhoe teeth 101 in place on tooth holders 102 on a bucket 100 is shown. The pin driving tool has a pair of spaced apart side rails 10*a* and 10*b* with connecting opposed first and second ends 11 and 12 to define an opening 10*c* for a plurality of the teeth 101 on the bucket 100. FIGS. 2 to 4 particularly illustrate a longitudinal driving axis along line a—a between opposed first and second ends 11 and 12 of the driving bar which passes through the opening. Preferably the ends 11 and 12 are perpendicular to the axis and the side rails are parallel to the axis so that a rectangle is formed. A round handle 13, is securely mounted on the outside of one of the said side rails 10*a* for holding the tool in one hand while driving. A drive punch 14 or 16 for removing or inserting pins 103 is removably mounted in an opening 15 (FIGS. 3 and 4) at the second end 12 and held in place by a removable cotter key 17. The removable cotter key 17, particularly shown in FIG. 1, is inserted through a passage 18 in the fastener 16 so that multiple tools can be mounted on the bar 10.

FIG. 3 particularly illustrates the driving bar 10 with the drive punch 14 separated from the opening 15 at the second end 12 and the removed cotter key 17 which is to be inserted in passage 18. The drive punch 14 is used for removing the pins 103 from the teeth 101 includes an elongated round head 19. The drive punch 14 includes an integral support ridge 14*a* which allows the driving. FIG. 4 shows an additional drive punch 16 having a flat head 20 for inserting the pins 103 which hold the backhoe teeth 101 in place on bucket 100. A passage 21 is provided for key 17.

Preferably the tool includes the fixed round handle 13; however, the handle can have different shapes and it can be removable. Also it is preferred that the punches 14 and 16 be removable from the tool but they can be fixed.

The pin driving tool operates by placing the driving bar 10 with teeth 101 on a bucket 100 in the opening 10*c*. The tool is then driven along the longitudinal driving axis a—a at the first end 11 with the drive punch means 14 or 16 against the pin 103 to be driven out or inserted. The handle 13 is held while driving the pin 103.

It is intended that the foregoing description be only illustrative of the present invention and that the present invention be limited only by the hereinafter appended claims.

I claim:

1. A pin driving tool for inserting or removing pins from teeth on a digging means, comprising:

(a) a rectangular driving bar having a ' longitudinal driving axis, said bar including spaced apart side rails on opposite sides of the axis and opposed first and second ends between said rails, said rails and said ends forming an opening large enough to enable said driving bar to be positioned around one of such teeth, said second end having an opening opposite the first end along the axis;

(b) a driving punch means removably mounted in said hole, said punch means having two ends, one end being shaped for removing or inserting one of such pins from said teeth on said digging means, said other end having fastening means for fastening said punch means to said driving bar;

(c) a holding means removably connected to said fastening end of said punch means to fasten said punch means to said driving bar and to allow the mounting of different punches in the driving bar;

(d) a handle means mounted to one of said side rails of said driving bar perpendicular to the driving axis for holding the tool in one hand; whereby said driving bar is fitted around a first tooth with the punch means engaged with a pin on an adjacent tooth with the punch means engaged with a pin on an adjacent tooth to enable the pin on the adjacent tooth to be removed or inserted.

2. A pin driving tool in accordance with claim 1 wherein the holding means includes a removable cotter key in a hole in the fastening end of the punch means.

3. A pin driving tool in accordance with claim 1 wherein the handle is about midway between the first and second ends of the driving bar on the side rail.

4. The pin driving tool in accordance with claim 1 wherein the driving punch means includes an elongated head for removing the pins.

5. The pin driving tool in accordance with claim 1 wherein the driving punch means includes a flat head for inserting the pins.

6. A method for removing or inserting pins which comprises:

(a) providing a pin driving tool for inserting or removing a pin which holds teeth in place on a digging means bucket where the tool comprises a driving bar having a longitudinal driving axis with spaced apart side rails on opposite sides of the axis and opposed first and second ends between the rails defining an opening which fits around at least one first tooth on a digging means having a plurality of spaced apart teeth each held in place by pins on the digging means, wherein the first end is for driving the bar, and a drive punch means mounted on the second end of the bar along the axis and shaped for removing or inserting one of the pins holding the teeth on the digging means, wherein the tool fits with the opening around the first tooth with the punch means engaged with the pin on a next adjacent second tooth to be removed or inserted;

(b) placing the driving bar between the plurality of teeth with the drive punch means against the pin; and (c) driving the bar at the first end to remove or insert the pin.

7. The method in accordance with claim 6 wherein the drive punch means for removing the pins includes an elongated head.

8. The method in accordance with claim 6 wherein the drive punch means for inserting the pins includes a flat head.

* * * * *